United States Patent
Adelman

(10) Patent No.: US 9,687,692 B1
(45) Date of Patent: Jun. 27, 2017

(54) UNIVERSAL RESISTANCE TRAINING DEVICE FOR A TREADMILL

(71) Applicant: Dean W. Adelman, Maple Grove, MN (US)

(72) Inventor: Dean W. Adelman, Maple Grove, MN (US)

(*) Notice: Subject to any disclaimer, the term of this patent is extended or adjusted under 35 U.S.C. 154(b) by 38 days.

(21) Appl. No.: 14/754,847

(22) Filed: Jun. 30, 2015

(51) Int. Cl.
*A63B 21/00* (2006.01)
*A63B 21/02* (2006.01)
*A63B 21/04* (2006.01)
*A63B 22/02* (2006.01)
*A63B 21/16* (2006.01)
*A63B 23/12* (2006.01)
*A63B 23/035* (2006.01)

(52) U.S. Cl.
CPC .......... *A63B 21/16* (2013.01); *A63B 21/1469* (2013.01); *A63B 23/035* (2013.01); *A63B 23/12* (2013.01); *A63B 22/02* (2013.01)

(58) Field of Classification Search
CPC ......... A63B 21/16; A63B 21/02; A63B 21/04; A63B 21/0442; A63B 22/00; A63B 22/0002; A63B 22/001; A63B 22/0012; A63B 22/02; A63B 22/1672; A63B 69/0028; A63B 69/0035; A63B 23/12; A63B 23/1209; A63B 23/1245; A63B 23/1281; A63B 23/035; A61H 1/02; A61H 1/0214
See application file for complete search history.

(56) References Cited

U.S. PATENT DOCUMENTS

| 5,000,440 | A | * | 3/1991 | Lynch | A63B 21/0615 482/112 |
| 5,662,560 | A | * | 9/1997 | Svendsen | A63B 21/4007 482/54 |
| 5,803,874 | A | * | 9/1998 | Wilkinson | A63B 22/0012 482/51 |
| 6,520,891 | B1 | * | 2/2003 | Stephens, Jr. | A63B 21/023 482/121 |
| 6,544,147 | B1 | * | 4/2003 | Wang | A63B 22/0235 482/54 |
| 7,585,254 | B1 | * | 9/2009 | Vittone | A63B 21/0552 482/51 |
| 7,878,950 | B1 | * | 2/2011 | Bastian | A63B 22/0235 482/139 |
| 8,257,232 | B2 | * | 9/2012 | Albert | A63B 69/0064 482/54 |
| 2002/0022554 | A1 | * | 2/2002 | Borsheim | A63B 22/02 482/54 |
| 2002/0160889 | A1 | * | 10/2002 | Lederman | A63B 22/02 482/83 |

(Continued)

*Primary Examiner* — Loan H Thanh
*Assistant Examiner* — Nyca T Nguyen
(74) *Attorney, Agent, or Firm* — David Alan Lingbeck

(57) ABSTRACT

A universal resistance training device for a treadmill for exercising and strengthening the arms and upper torso while working out on a treadmill. The universal resistance training device for a treadmill includes a telescoping support assembly; a bracket assembly pivotably attached to the telescoping support assembly and adapted to detachably engage opposed handholds of a treadmill; a telescoping arm rotatably and securely mounted about the telescoping support assembly; and a resistance support member in communication with the telescoping arm.

12 Claims, 2 Drawing Sheets

(56) References Cited

U.S. PATENT DOCUMENTS

| | | | | |
|---|---|---|---|---|
| 2005/0255971 A1* | 11/2005 | Solomon | .............. | A61H 1/0229 |
| | | | | 482/54 |
| 2005/0277520 A1* | 12/2005 | Van Waes | .............. | A63B 22/02 |
| | | | | 482/54 |
| 2009/0075784 A1* | 3/2009 | Hoggan | .............. | A63B 22/0012 |
| | | | | 482/54 |
| 2009/0253559 A1* | 10/2009 | Maresh | .............. | A63B 23/1209 |
| | | | | 482/93 |
| 2013/0203567 A1* | 8/2013 | Thomas | .............. | A63B 21/4025 |
| | | | | 482/124 |
| 2015/0080187 A1* | 3/2015 | Beane | ................ | A63B 69/0064 |
| | | | | 482/51 |

\* cited by examiner

UNIVERSAL RESISTANCE TRAINING DEVICE FOR A TREADMILL

BACKGROUND OF THE INVENTION

Field of the Invention

The present invention relates to resistance exercisers and more particularly pertains to a new universal resistance training device for a treadmill for exercising and strengthening the arms and upper torso while working out on a treadmill Description of the Prior Art The use of resistance exercisers is known in the prior art. More specifically, resistance exercisers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a lower support frame mounted to a lower body support structure and an upper body exercise structure thereon. The upper body exercise structure includes an upper frame which is selectively and adjustably mounted on the lower support frame. A flywheel is rotatably mounted in the upper frame. A belt and selectable number of weights drag along the flywheel for selectively adjusting the effort required to maintain rotation of the flywheel. Another prior art includes a rocker arm for an electric treadmill which includes an upright frame, a base frame, a front supporting leg and a rear supporting leg. A console is mounted on the upright frame, and a handrail is fitted to either side thereof. A continuous belt circles therearound for an in-place rotation. Also, another prior art includes a treadmill of conventional design including upper body exercise features involving a lever having a rearwardly disposed gripping handle and a forwardly disposed extremity pivotably secured to a stanchion of adjustable height. Reversibly extensible tether bands or springs extend between the lever and the stanchion. Further, another prior art includes a bed having a driving motor provided under the bed; a rotary traction device; a lower-limb traction device connected to a front portion of the rotary traction device; and an upper-limb traction device connected to a rear portion of the rotary traction device. While these devices fulfill their respective, particular objectives and requirements, the aforementioned patents do not disclose a new universal resistance training device for a treadmill.

SUMMARY OF THE INVENTION

The general purpose of the present invention, which will be described subsequently in greater detail, is to provide a new universal resistance training device for a treadmill which has many of the advantages of the resistance exercisers mentioned heretofore and many novel features that result in a new universal resistance training device for a treadmill which is not anticipated, rendered obvious, suggested, or even implied by any of the prior art resistance exercisers, either alone or in any combination thereof. The present invention may include a telescoping support assembly; a bracket assembly pivotably attached to the telescoping support assembly and adapted to detachably engage opposed handholds of a treadmill; a telescoping arm rotatably and securely mounted about the telescoping support assembly; and a resistance support member in communication with the telescoping arm. None of the prior art includes the combination of the elements of the present invention.

There has thus been outlined, rather broadly, the more important features of the universal resistance training device for a treadmill in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new universal resistance training device for a treadmill which has many of the advantages of the resistance exercisers mentioned heretofore and many novel features that result in a new universal resistance training device for a treadmill which is not anticipated, rendered obvious, suggested, or even implied by any of the prior art resistance exercisers, either alone or in any combination thereof.

Still another object of the present invention is to provide a new universal resistance training device for a treadmill for exercising and strengthening the arms and upper torso while working out on a treadmill.

Still yet another object of the present invention is to provide a new universal resistance training device for a treadmill that can be easily mounted and dismounted from any treadmill.

Even still another object of the present invention is to provide a new universal resistance training device for a treadmill that allows the user to position the support arm above the waist of the user to work the shoulder muscles, horizontally at chest level of the user to work the pectorals and below the waist to work the biceps and triceps of the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
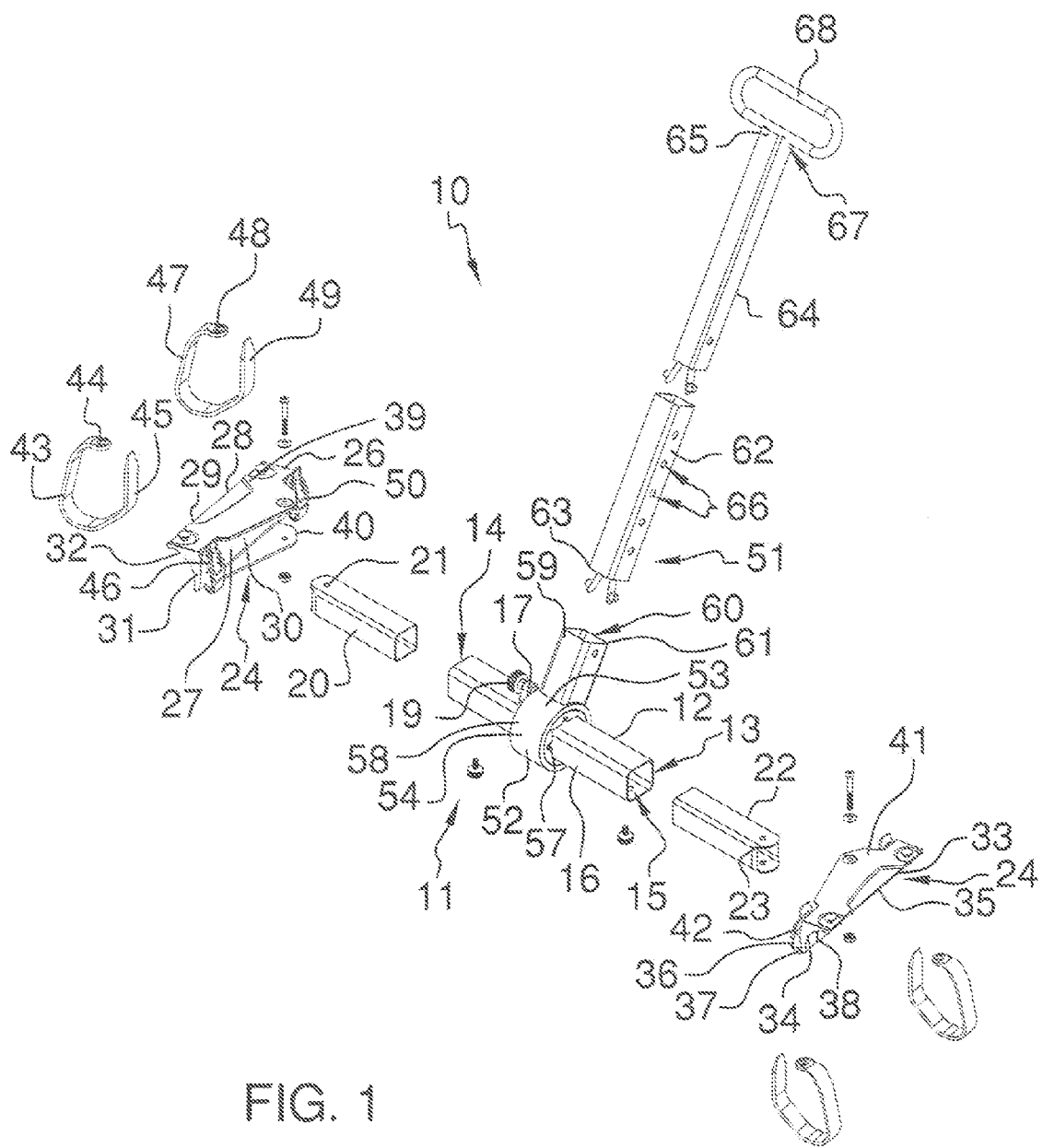
FIG. 1 is an exploded perspective view of a new universal resistance training device for a treadmill according to the present invention.
Figure 2:
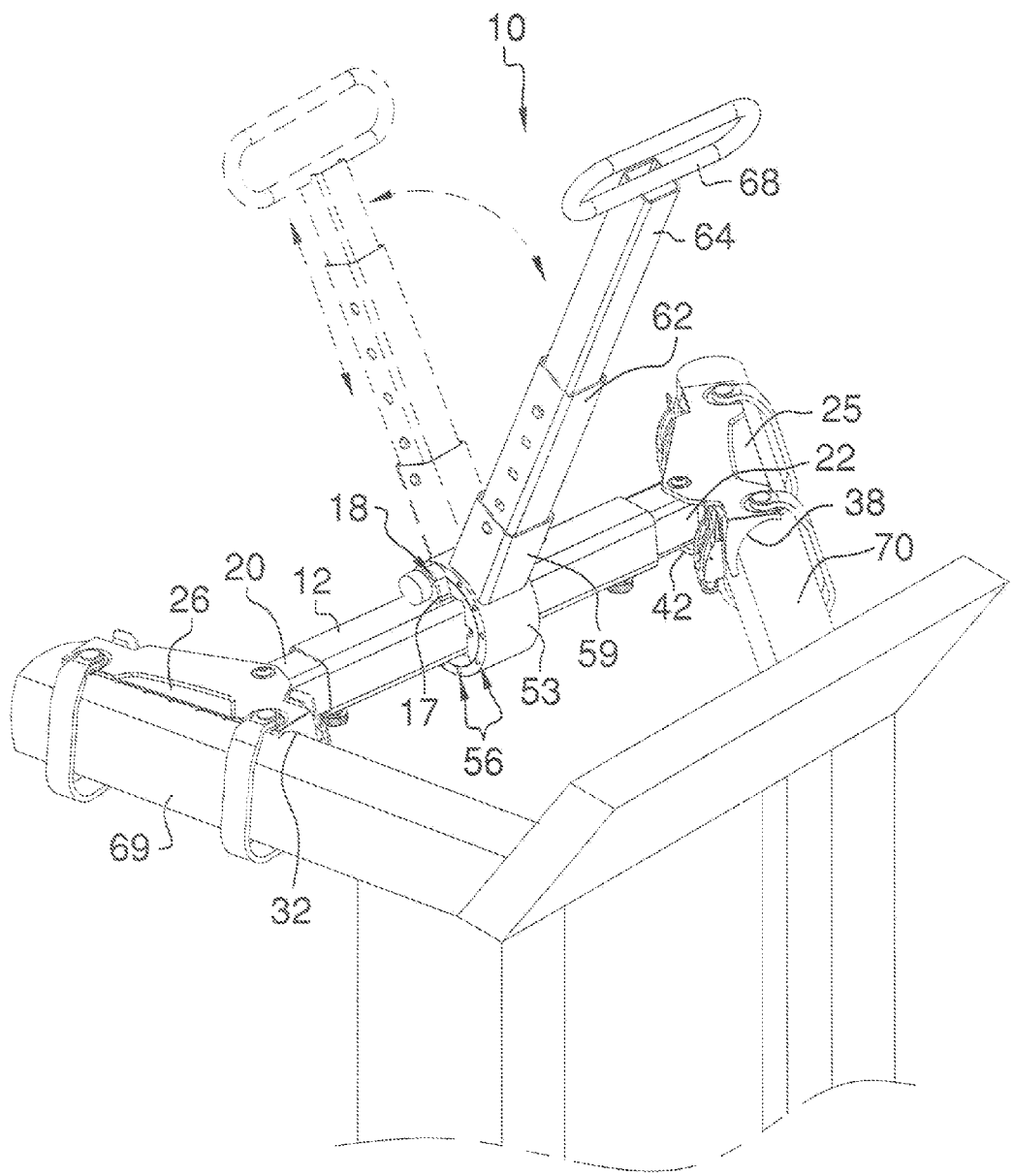
FIG. 2 is a top perspective view of the present invention mounted to a treadmill.

With reference now to the drawings, and in particular to FIGS. 1 and 2 thereof, a new universal resistance training device for a treadmill embodying the principles and concepts of the present invention and generally designated by the reference numeral 10 will be described.

As best illustrated in FIGS. 1 and 2, the universal resistance training device for a treadmill 10 may generally comprise a telescoping support assembly 11; a bracket assembly 24 pivotably and conventionally attached with pins to the telescoping support assembly 11 and adapted to detachably engage opposed handholds of a treadmill; a telescoping arm 51 rotatably, securely and conventionally mounted about the telescoping support assembly 11; and a resistance support member 68 in communication with the telescoping arm 51.

As shown in FIGS. 1 and 2, the telescoping support assembly 11 may include a main tubular member 12 having open ends 13,14 and a bore 15 extending therethrough, and may also include a lug 17 conventionally attached and welded to an outer side 16 of the main tubular member 12 and having an opening 18 laterally disposed therethrough, and may further include a biased fastener 19 disposed in and through the opening 18. The telescoping support assembly 11 may also include elongate extension members 20,22 each disposed in the bore 15 and extendable from a respective open end 13,14 of the main tubular member 12 and each having an outer end 21,23.

As illustrated in FIGS. 1 and 2, the bracket assembly 24 may include bracket members 25,26 each pivotably and conventionally attached to the outer end 21,23 of a respective elongate extension member 20,22. Each of the bracket members 25,26 may include a pair of flanges 39-42 with a solid elongate body 27,33 conventionally attached and welded to and separating the flanges 39-42. The pair of flanges 39-42 of each of the bracket members 25,26 may be pivotably coupled with the pins to the outer end 21,23 of the respective elongate extension member 20,22. Each of the flanges 39-42 may have an intermediate projecting portion with a hole disposed therethrough and through which the pin is removably inserted. The solid elongate body 27,33 of each of the bracket members 25,26 may include first and second planar sides 28,30,34,36 disposed perpendicular to one another with one of the planar sides 30,36 facing the respective elongate extension member 20,22. Each of the solid elongate bodies 27,33 may further include a lateral inwardly beveled outer side 32,38 which extends from an outer end 29,35 of the first planar side 28,34 to an outer end 31,37 of the second planar side 30,36 and faces away from the respective elongate extension member 20,22 and may be adapted to mount flush to a respective one of the handle bars 69,70 of the treadmill. The bracket assembly 24 may further include adjustable straps 43,47 having ends 43,44,48,49 conventionally secured with fasteners to the bracket members 25,26 and may also have clasps 46, 50 for tightening and securing the adjustable straps 43,47 about the handle bars 69,70 of the treadmill. The adjustable straps 43,47 may extend about the beveled outer sides 32,38 of the elongate bodies 27,33 and in cooperation with the beveled outer sides 32,38 secure the bracket members 25,26 and the universal resistance training device 10 to the handle bars 69,70 of the treadmill.

As shown in FIGS. 1 and 2, the telescoping arm 51 may include a base section 52 rotatably and conventionally mounted about the main tubular member 12 adjacent to the lug 17. The base section 52 may include a hollow cylindrical portion 53 having a side wall 54 with the main tubular member 12 disposed through the cylindrical portion 53, and may also include a tubular portion 59 conventionally attached and welded to an outer side 58 of the side wall 54 of the cylindrical portion 53 and extending outwardly therefrom. The base section 52 may further include a bushing 57 conventionally disposed in the hollow cylindrical portion 53 and engagable to the main tubular member 12. The cylindrical portion 53 may also include slots 56 spaced apart and disposed in, along and about an end of the side wall 54 of the hollow cylindrical portion 53 with the biased fastener 19 of the telescoping support assembly 11 removably received in one of the slots 56 to secure the telescoping arm 51 relative to the main tubular member 12. The tubular portion 59 may have an open outer end 61 and a bore 60 extending therein. The telescoping arm 51 may further include an intermediate hollow tubular section 62 having a proximate end 63 removably disposed through the open outer end 61 of and fastenable with a fastener to the tubular portion 59. The telescoping arm 51 may also include an outer tubular section 64 having an outer end 65 and telescopingly disposed in and conventionally fastenable to the intermediate tubular section 62 with the outer tubular section 64 having holes 66 disposed in and spaced along a length thereof for receiving a biased fastening member. The outer tubular section 64 may further have opposed openings 67 extending laterally therethrough proximate the outer end 65 thereof. The resistance support member 68 may be conventionally connected to the outer tubular section 64 and may be adapted to support resistance members. The resistance support member 68 may extend through the opposed openings 67 of the outer tubular section 64 and may be an endless tubular member.

In use, the bracket assembly 24 may be fastened to the opposed handle bars 69,70 of the treadmill using the straps 43,47 and the clasps 46,50. The inwardly beveled outer sides 32,38 of the solid elongate bodies 27,33 may be strapped with straps 43,37 flush to the opposed handle bars 69,70 of the treadmill. The telescoping arm 51 may be securely positioned about the support assembly 11 for a desired exercise routine. The telescoping arm 51 may include extending the telescoping arm 51 above a waist of a user while on the treadmill or extending the telescoping arm 51 forward of the user between chest and waist high or extending the telescoping arm 51 below the waist of the user. One or more resistance members may be connected to the resistance support member 68. The desired exercise routine using the resistance members may be performed by the user while using and running or walking on the treadmill.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the universal resistance training device for a treadmill. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A universal resistance training device for a treadmill comprising:
   a telescoping support assembly, wherein the telescoping support assembly includes a main tubular member having open ends and a bore extending therethrough, wherein the telescoping support assembly also includes a lug attached to an outer side of the main tubular member and having an opening laterally disposed through the lug, and further including a biased fastener disposed in and through the opening;
   a bracket assembly pivotably attached to the telescoping support assembly and adapted to detachably engage opposed handle bars of the treadmill;
   a telescoping arm rotatably and securely mounted about the telescoping support assembly; and
   a resistance support member in communication with the telescoping arm.

2. The universal resistance training device for the treadmill as described in claim 1, wherein the telescoping arm includes a base section rotatably mounted about the main tubular member adjacent to the lug, wherein the base section includes a hollow cylindrical portion having a side wall with the main tubular member disposed through the cylindrical portion, and also includes a tubular portion attached to an outer side of the side wall of the cylindrical portion and extending outwardly therefrom.

3. The universal resistance training device for the treadmill as described in claim 2, wherein the tubular portion has an open outer end and a bore extending therein, wherein the telescoping arm further includes an intermediate hollow tubular section having a proximate end removably disposed through the open outer end of and fastenable to the tubular portion.

4. The universal resistance training device for the treadmill as described in claim 3, wherein the telescoping arm also includes an outer tubular section having an outer end and telescopingly disposed in and fastenable to the intermediate hollow tubular section.

5. The universal resistance training device for the treadmill as described in claim 4, wherein the outer tubular section further has opposed openings extending laterally therethrough proximate the outer end thereof.

6. The universal resistance training device for the treadmill as described in claim 5, wherein the resistance support member is connected to the outer tubular section and is adapted to support elastic resistance members.

7. The universal resistance training device for the treadmill as described in claim 6, wherein the resistance support member extends through the opposed openings of the outer tubular section and is an endless tubular member.

8. The universal resistance training device for the treadmill as described in claim 2, wherein the base section further includes a bushing disposed in the hollow cylindrical portion and engagable to the main tubular member, wherein the cylindrical portion also includes slots spaced apart and disposed in, along and about an end of the side wall of the hollow cylindrical portion with the biased fastener of the telescoping support assembly removably received in the slots to secure the telescoping arm relative to the main tubular member.

9. A universal resistance training device for a treadmill comprising:
   a telescoping support assembly, wherein the telescoping support assembly includes a main tubular member having open ends and a bore extending therethrough, wherein the telescoping support assembly also includes elongate extension members each disposed in and extendable from a respective said open end of the main tubular member and each having an outer end;
   a bracket assembly pivotably attached to the telescoping support assembly and adapted to detachably engage opposed handle bars of the treadmill wherein the bracket assembly includes bracket members each pivotably attached to the outer end of a respective said elongate extension member, wherein each of the bracket members includes a pair of flanges with a solid elongate body attached to and separating the flanges, wherein the pair of the flanges of each of the bracket members are pivotably attached to the outer end of the respective elongate extension member, wherein the solid elongate body of each of the bracket members includes first and second planar sides disposed perpendicular to one another with one of the planar sides facing the respective elongate extension member, wherein each of the solid elongate bodies further includes a lateral inwardly beveled outer side which extends from an outer end of the first planar side to an outer end of the second planar side and faces away from the respective elongate extension member and is adapted to mount flush to a respective one of the handle bars of the treadmill;
   a telescoping arm rotatably and securely mounted about the telescoping support assembly; and
   a resistance support member in communication with the telescoping arm.

10. The universal resistance training device for the treadmill as described in claim 9, wherein the bracket assembly further includes adjustable straps having ends secured to the bracket members and also having clasps for tightening and securing the adjustable straps about the handle bars of the treadmill; wherein the adjustable straps extend about the beveled outer sides of the elongate bodies and in cooperation with the beveled outer sides secure the bracket members and the universal resistance training device to the handle bars of the treadmill.

11. A method of using a universal resistance training device for a treadmill comprising the steps of:
   providing a telescoping support assembly, a bracket assembly pivotably connected to the support assembly, a telescoping arm rotatably mounted to the support assembly, a resistance support member in communication with the telescoping arm, wherein the bracket assembly includes elongate bodies each having an inwardly beveled outer side to conform to respective opposed handle bars of the treadmill and also includes straps connected to the elongate bodies;
   fastening the bracket assembly to the opposed handle bars of the treadmill;
   securely positioning the telescoping arm about the support assembly for a desired exercise routine;
   connecting one or more resistance members to the resistance support member; and
   performing the desired exercise routine using the one or more resistance members while using the treadmill.

12. The method of using the universal resistance training device for the treadmill as described in claim 11, wherein fastening the bracket assembly includes strapping the inwardly beveled outer sides of the elongate bodies flush to the handle bars of the treadmill.

* * * * *